US010581301B2

(12) United States Patent
Verardi et al.

(10) Patent No.: US 10,581,301 B2
(45) Date of Patent: Mar. 3, 2020

(54) SYSTEM FOR FIXING THE INNER AIR DEFLECTOR ON DEFLECTIVE COVER FOR ROTATING ELECTRICAL MACHINE

(71) Applicant: WEG Equipamentos Elétricos S.A., Jaraguá do Sul (BR)

(72) Inventors: Marcelo Verardi, Joinville (BR); Pedro Zoz Dilson, Jaraguá do Sul (BR)

(73) Assignee: WEG EQUIPAMENTOS ELÉTRICOS S.A., Santa Catarina (BR)

( * ) Notice: Subject to any disclaimer, the term of this patent is extended or adjusted under 35 U.S.C. 154(b) by 727 days.

(21) Appl. No.: 15/100,972

(22) PCT Filed: Dec. 12, 2013

(86) PCT No.: PCT/BR2013/000564
§ 371 (c)(1),
(2) Date: Aug. 22, 2016

(87) PCT Pub. No.: WO2015/085379
PCT Pub. Date: Jun. 18, 2015

(65) Prior Publication Data
US 2016/0352195 A1    Dec. 1, 2016

(51) Int. Cl.
*H02K 15/00* (2006.01)
*H02K 9/06* (2006.01)
(52) U.S. Cl.
CPC ......... *H02K 15/0006* (2013.01); *H02K 9/06* (2013.01)
(58) Field of Classification Search
CPC .... H02K 15/00; H02K 15/0006; H02K 9/005; H02K 9/00; H02K 9/02; H02K 9/04; H02K 9/06
(Continued)

(56) References Cited

U.S. PATENT DOCUMENTS 3,177,388 A * 4/1965 Cook .................. H02K 5/148
310/247
4,181,172 A * 1/1980 Longhouse ............ B60K 11/04
123/41.49
(Continued)

FOREIGN PATENT DOCUMENTS

BR       1002457      *  5/2012
DE    102006014499 A1   10/2007
(Continued)

OTHER PUBLICATIONS

International Search Report and Written Opinion dated Sep. 12, 2014 for PCT/BR2013/000564.

*Primary Examiner* — Mang Tin Bik Lian
*Assistant Examiner* — Ahmed Elnakib
(74) *Attorney, Agent, or Firm* — Troutman Sanders LLP; Ryan Schneider

(57) ABSTRACT

A system for fixing the inner air deflector on a deflective cover for a rotating electrical machine, wherein this deflector is fixed onto the deflective cover using a fixing element and a nut placed through elongated holes on flaps of the inner deflector and through elongated holes on the deflective cover, so that the tightening of the fixing set is performed from an outer part of the housing of the machine, enabling adjustment of a gap between an outer edge of blades of a fan and an inner surface of the inner air deflector, in order to minimize the effects of formation of counter-flowing air currents near the gap.

19 Claims, 6 Drawing Sheets

(58) Field of Classification Search
USPC .................................. 310/62, 63, 89, 91, 40.5
See application file for complete search history.

(56) References Cited

U.S. PATENT DOCUMENTS

| | | | | |
|---|---|---|---|---|
| 4,186,317 | A * | 1/1980 | Sisk | H02K 5/18 |
| | | | | 310/60 R |
| 4,548,548 | A | 10/1985 | Gray, III | |
| 4,602,181 | A * | 7/1986 | Dietrich | H02K 5/14 |
| | | | | 310/241 |
| D297,761 | S * | 9/1988 | Shiraki | D23/370 |
| 4,800,315 | A | 1/1989 | Schulz et al. | |
| 4,987,985 | A | 1/1991 | Meckstroth et al. | |
| 5,343,101 | A * | 8/1994 | Matani | H02K 9/06 |
| | | | | 310/58 |
| 5,731,651 | A | 3/1998 | Hyodo | |
| 5,803,707 | A * | 9/1998 | Schips | F04D 17/04 |
| | | | | 415/213.1 |
| 5,811,908 | A * | 9/1998 | Iwata | F02B 63/04 |
| | | | | 310/156.08 |
| 6,188,153 | B1 * | 2/2001 | Hokanson | H02K 9/005 |
| | | | | 310/52 |
| 7,326,032 | B2 | 2/2008 | Vinson et al. | |
| 7,696,663 | B2 | 4/2010 | Schmohl et al. | |
| 2016/0352195 | A1 * | 12/2016 | Verardi | H02K 15/0006 |

FOREIGN PATENT DOCUMENTS

| | | |
|---|---|---|
| DE | 102011053138 A1 | 2/2013 |
| EP | 1462657 A1 | 9/2004 |
| GB | 2000477 A | 1/1979 |
| JP | 2005048537 * | 2/2005 |

* cited by examiner

SYSTEM FOR FIXING THE INNER AIR DEFLECTOR ON DEFLECTIVE COVER FOR ROTATING ELECTRICAL MACHINE

FIELD OF APPLICATION

The invention consists of a system for fixing the inner air deflector (3) on a deflective cover (1) for rotating electrical machine, wherein this deflector is fixed onto the deflective cover (1) using a screw (7) and a nut (8) placed by means of elongated holes (3.1) on the flaps (3.2) of the inner deflector (3) and elongated holes (1.1) on the deflective cover (1), so that the tightening of the nut-screw set is performed from the outer part of the housing, enabling adjustment of the gap (6) between the outer edge of the blades of the inner fan (2) and the inner surface of the inner air deflector (3) in order to minimize the effects of the formation of counter-flowing air currents near the gap (6).

BACKGROUND OF THE INVENTION

Electric machines should maintain a controlled operation temperature, in order to avoid physical damage and increase efficiency during work. Normally, the air cooling systems use a fan positioned on the inner side of the deflective cover of the machine, which performs the forced convection of the air over the machine housing. The higher the airflow passage through the machine, the higher the efficiency of the cooling system. Thus, any resistance points to the free flow, such as physical obstacles or occurrence of unnecessary turbulence, should be avoided.

Currently, the fan is fixed on the rear edge of the motor shaft (4), which is already mounted on the machine; in a previous phase, the inner deflector is fixed onto the deflective cover. This way, the assembly of the deflector-cover-fan set is performed in different phases, where the deflective cover and inner deflector set is assembled last.

However, there should be a gap between the outer edge of the inner fan blades and the inner surface of the deflector, in order to avoid dragging of the edges of the fan blades on the inner surface of the deflector. This gap should compensate for all assembly tolerances of the aforementioned components. If this gap is too large, there may be some local air turbulence; if too small, there may be physical contact between the fan and the inner surface of the deflector.

In essence, this invention proposes an assembly solution for the system in order to allow more suitable positioning of the inner deflector regarding the fan, enabling the inner deflector to be mounted last on the machine, after the fan and the deflective cover are already mounted.

DESCRIPTION OF THE STATE OF THE ART

In the state of the art, documents featuring possible solutions to the positioning issue exist.

Patent EP1462657 teaches a system for assembling an axial fan with the function of reducing the turbulence and counter-flow in the gap between the blades of the fan and the deflector protection. In this invention, the blade edges are connected to a ring and then inserted into the deflector. This decreases the gap and helps guide the airflow in the region. This is a similar solution than the one featured on GB2000477 for automotive vehicle fans.

Another possibility for diminishing the aforementioned gap is pointed out by document U.S. Pat. No. 7,326,032, which teaches a system that enables fixation of a filling on the inner surface of the deflector. However, the system was not developed for electric machines, but for switching fans. Likewise, document U.S. Pat. No. 4,987,985 features a way to diminish the gap on automobile fans.

In turn, U.S. Pat. No. 4,548,548 describes a ventilation system used to circulate air in heat exchangers. In this system, the blades have a specific shape that is capable of providing a uniform airflow on the fan outlet. The deflector is built in a shape that reduces formation of counter-flowing air currents.

Considering the above, the presented documents bring proposals that offer solutions for minimizing the formation of counter-flowing air currents in the gap between the edges of the fan blades and the inner surface of the deflector.

OBJECTIVE OF THE INVENTION

On the documents found in the state of the art, the solutions seek to minimize the gap using filling material or reduction of the vibration of the blades, mainly connecting their outer edges.

The invention circumvents the disadvantages inherent to the state of the art by revealing a SYSTEM FOR FIXING, which allows fixing of the deflector after mounting the deflective cover and the axial fan on the motor, thus enabling alignment of the inner part of the deflector with the outer part of the fan. This way, the gap between the fan blades and the inner deflector is adjusted, minimizing losses caused by air turbulence in this space.

Distinctly, this invention presents a new solution that consists of mounting the inner deflector after finishing the assembly of the other components of the electric machine, especially the fan and its deflective cover. Thus, there is flexibility for a better adjustment of the deflector position regarding the fan.

Another advantage of this new system is to allow assembly and disassembly of the deflector-cover-fan set without the need of specific tools or locking mechanisms for inner nuts during maintenance of the fan or deflector.

To enable this, a SYSTEM FOR FIXING of the fan-deflector-cover set was developed, which allows tightening of the screws and adjustment of position from the outside the machine. Thus, it is possible to adjust the position of the parts with the entire set already assembled, but not fully fixed.

DESCRIPTION OF THE INVENTION

This invention consists of a system for fixing the inner air deflector (3) fixed on a deflective cover (1) for electric motors equipped with a fan (2), in order to enable the regulation of the gap (6) formed between the edges of the fan blades (2) and the inner part of the inner deflector body (3).

The inner deflector body (3) has from one to a plurality of flaps (3.2) with elongated holes (3.1) lagged equidistantly or not around the shaft of the electric machine.

Elongated holes (1.1) are understood as holes made on the flaps (3.2) of the deflector body (3) in order to allow the cover (1) to be fixed by the fixing elements (7 and 8). The elongated holes may feature various shapes that enable this fixing manner.

On a first shape, the elongated hole (1.1) features a rectangular shape, curved or not, with one of the edges allowing the passage of the fixing element body, but not the respective heads. FIG. 5 presents an elongated hole, not curved, with an edge allowing the passage of a hexagon nut (8) or the head of a hexagon screw (7).

In a second variant (FIG. 10), the elongated hole features a rectangular shape with the smaller sides shaped as a semicircle.

In a third variant, the hole of the second variant is rotated 90°.

Other similar shapes may be attained with this same concept.

Preferably, a deflector body (3) is used with three flaps (3.2) lagged 120° from the position of the elongated holes (3.1) that feature different shapes according to the variant of the system for fixing.

On the deflective cover (1), there is at least one elongated hole (1.1) up to a plurality of said holes, which are lagged equidistantly or not around the shaft of the electric machine with different shapes according to the variant of the system for fixing. Preferably, deflective covers (1) with three elongated holes (1.1) are used, lagged 120° in order to match the holes of the deflector forming an "X".

The system consists of fixing the inner deflector (3) on the deflective cover (1) with the aid of fixing elements, preferably hexagon-shaped (7), screwed on hexagon nuts (8). The set of fixing elements may be, preferably, a nut and a screw that are positioned through the elongated holes (3.1) of the deflective cover and the holes of the inner deflector (1.1).

The tightening of the screw-nut set is performed by the outer part of the housing of the rotating electrical machine. On the inner side of the inner deflector body (3) near the holes (1.1), there are walls (1.2) supporting the fixing elements (7) to prevent their rotation when the nut (8) is tightened by the outer part of the body.

In order to adjust the size (δ) of the gap (6) uniformly, a spacer is used between the edges of the inner fan blades (2) and the inner part of the inner deflector (3) prior to final tightening of the nut-screw set (7-8). The spacer is used only on the assembly phase.

In a first assembly, the head of the fixing element (7) will remain in the inner part of the housing, blocked by the walls (1.2). Afterwards, the nut (8) is mounted by the outside. The position of the deflector is adjusted in order to remain concentrically positioned regarding the inner fan (2), and then the final tightening of the entire set is performed.

In a second assembly, the hexagon nut (8) is placed in the inner part of the deflector. Afterwards, the fixing element (7) is tightened from the outer part of the machine housing, so that the deflector (3) remains concentrically positioned in relation to the inner fan (2).

The difference between these two assemblies is the position of the nut (8) and the fixing element (7). In the first one, the head of the fixing element is in the inner part of the housing; in the second one, it faces the outer part.

In a third system, fixing is performed with a fixing element (7) and a rectangular nut (9), and said nut must transpose the holes (1.1) of the deflective cover and the holes of the inner deflector (1.3). In the inner part of the deflector body there is a wall (1.2) that prevents the rotation of the nut when the fixing element is tightened by the outer part of the housing.

It should be noted that the term previously mentioned (namely, "nut") should not be considered as restrictive or limiting, with other variants being possible and comprising similar elements, within the scope of the invention claimed herein.

It will obviously be noted that other modifications and variants are considered within the scope of this invention, not restricted to what was previously exposed.

DETAILED DESCRIPTION OF THE FIGURES

Figure 1:
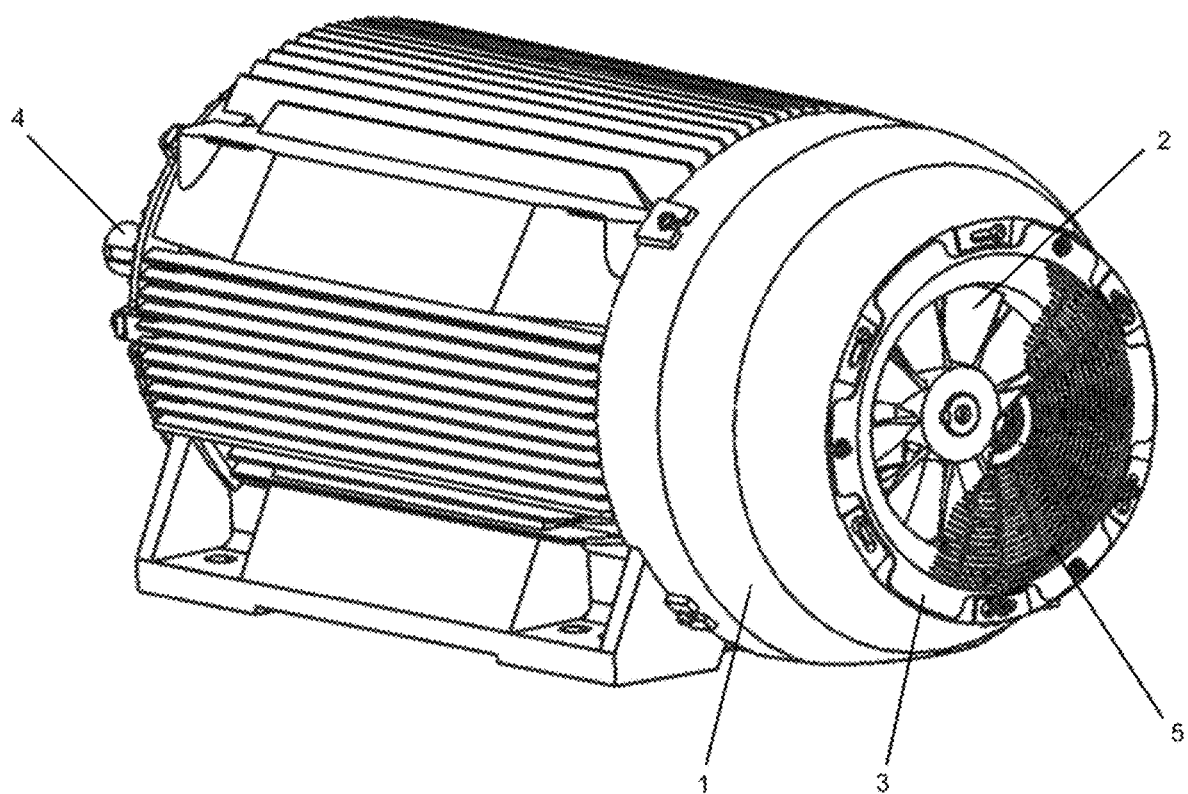
FIG. 1 shows a general view of the electric motor with the inner deflector installed.

FIG. 1 presents a general positioning view of the inner deflector in an electric motor. The inner deflector (3) is fixed onto the deflective cover (1) concentrically to the fan (2), which is mounted concentrically to the machine shaft (4). The grid (5) of the deflective cover (1) is positioned concentrically to the motor shaft and, in FIG. 1, it has a sectional view in order to highlight the position of the fan (2).

Figure 2:
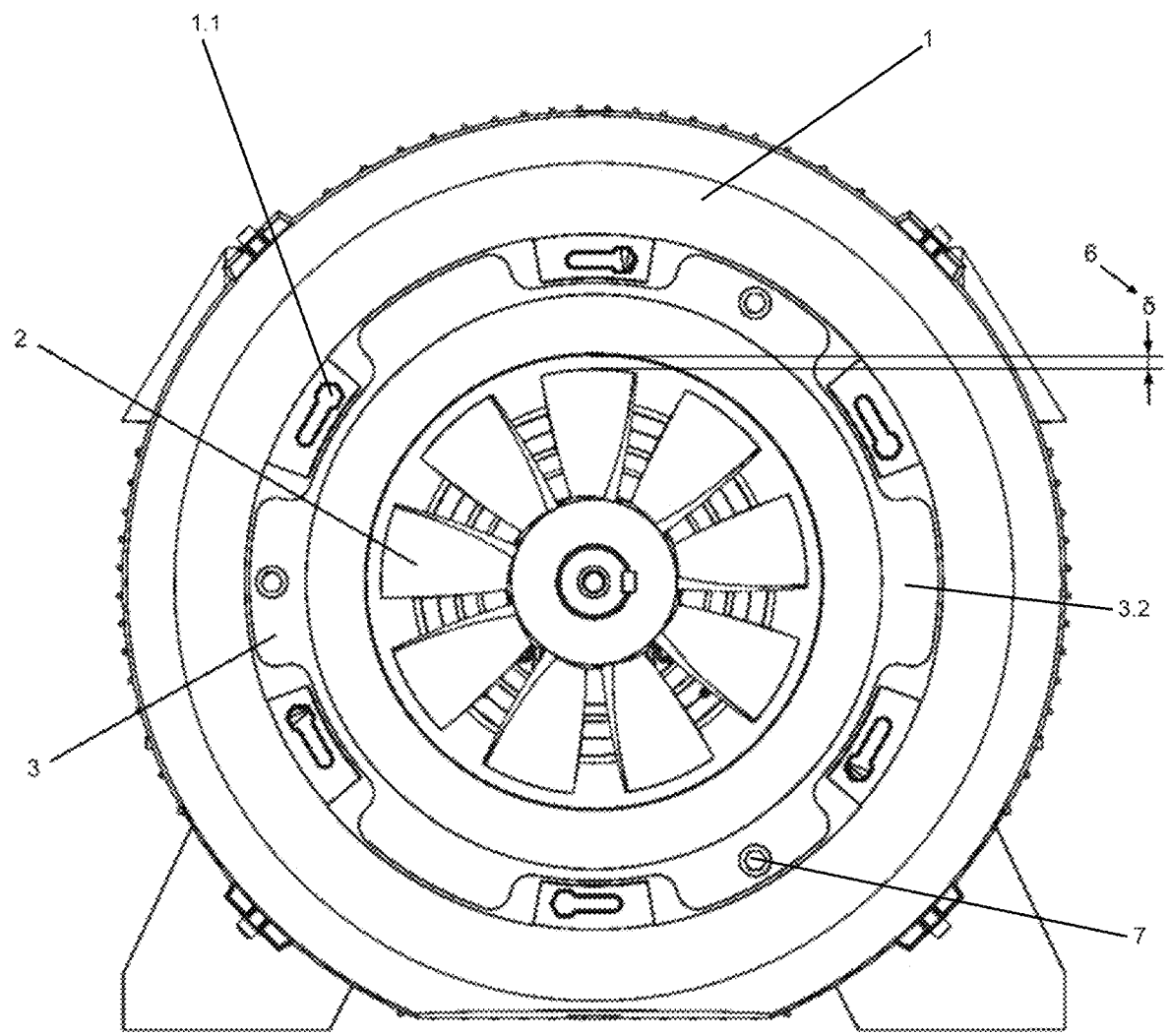
FIG. 2 shows a rear view of the electric motor with the inner deflector installed.

FIG. 2 features a rear view of the motor with the inner deflector system installed, comprising the deflective cover (1), the fan (2) and the inner deflector (3), but without the grid (5), highlighting the gap (6) of thickness (6) between the blades of the fan (2) and the inner deflector (3) after fixing the deflector.

Figure 3:
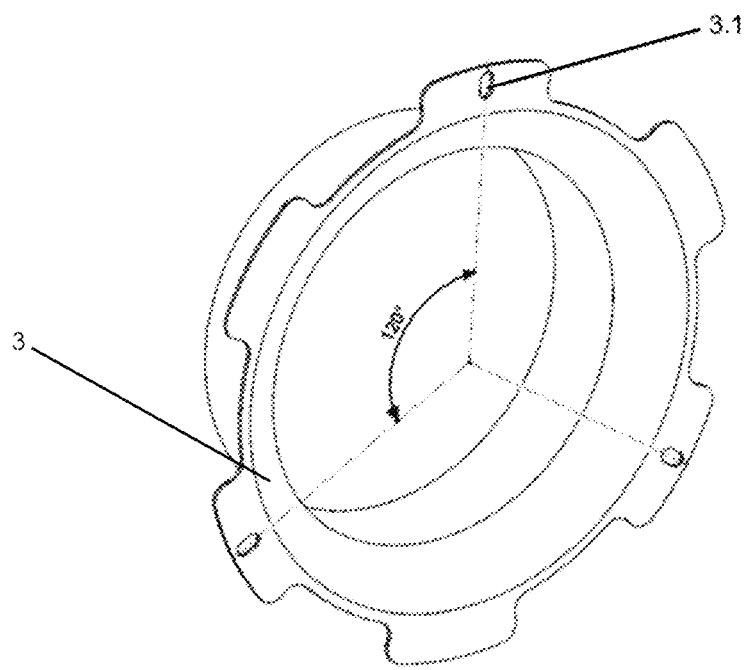
FIG. 3 shows the construction of the inner deflector.

FIG. 3 shows the inner deflector (3) and a possible assembly with three flaps (3.2) with elongated holes (3.1) lagged 120° around the shaft of the electric machine.

Figure 4:
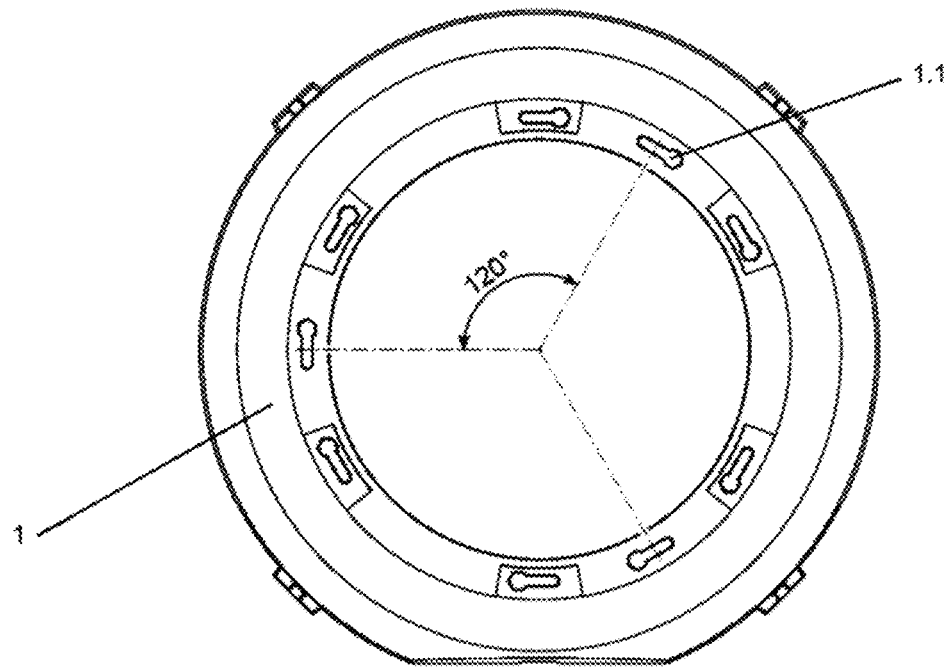
FIG. 4 shows a rear view of the electric motor without the inner deflector.

FIG. 4 shows the deflective cover (1) used in the assembly suggested by FIG. 3 with three elongated holes (3.1) lagged 120° around the shaft of the electric machine, where the inner deflector (3), shown in FIG. 3, will be fixed.

Figure 5:
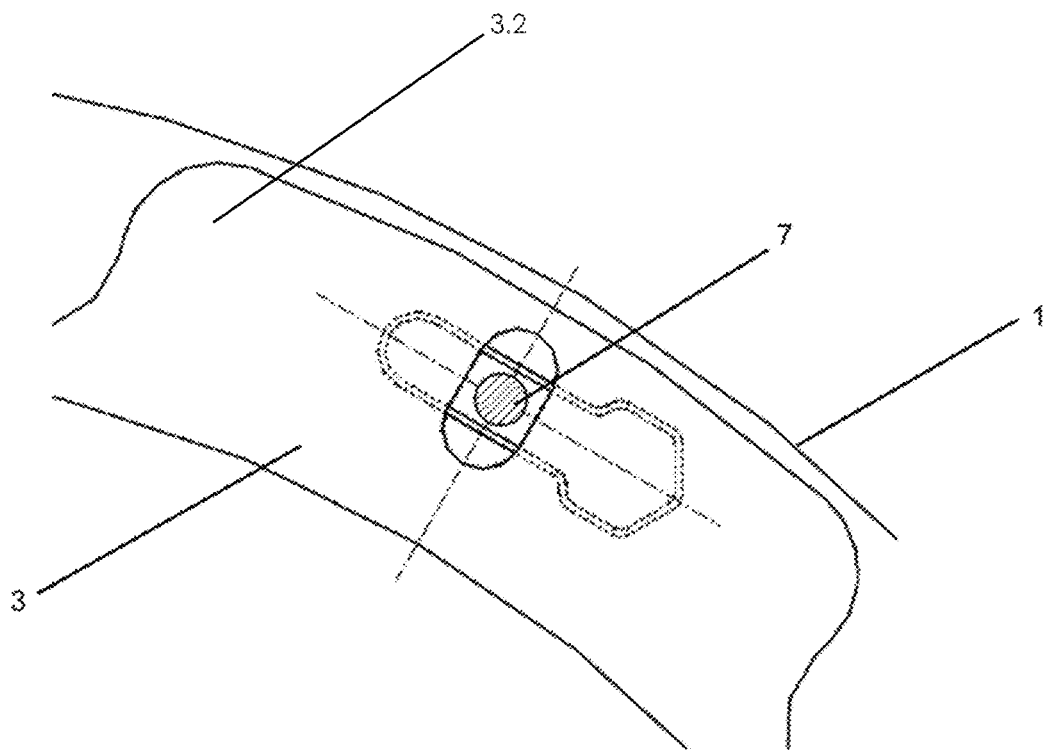
FIG. 5 shows a detailed view of a possible assembly of the System for fixing the inner deflector on the housing of the electric motor, viewed from the inner part of the motor.

FIG. 5 shows, from the outer part of the motor, the system for fixing the inner deflector (3), comprising the fixing element (7), preferably hexagon-shaped, inserted from the inner part of the housing of the machine on the elongated hole (1.1) of the deflective cover (1) and through the elongated hole (3.1) of the flap (3.2) of the inner deflector (3), with said holes forming an "X", and the fixing is performed by tightening the nut (8), preferably hexagon-shaped, enabling the adjust of the gap (6) size between the inner deflector (3) and the outer edge of the blade of the inner fan (2) after assembly the components.

Figure 6:
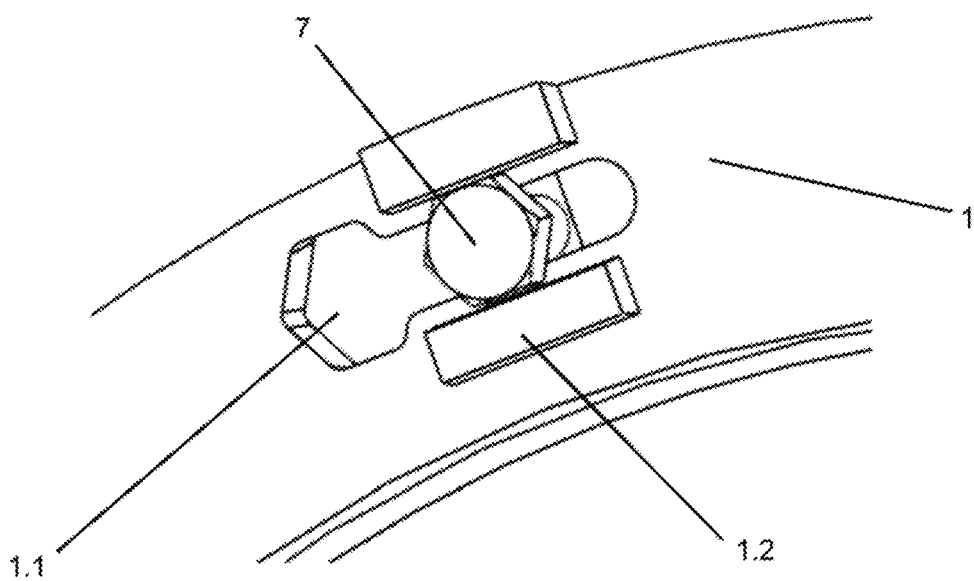
FIGS. 6 and 7 show the assembly of the System for fixing the inner deflector on the housing of the electric motor.

FIG. 6 shows the assembly featured in FIG. 5, from the inner part of the electric machine, detailing the head of the fixing element (7), preferably hexagon-shaped, that is shouldered on the walls (1.2) positioned in the inner part of the deflective cover (1) around the elongated hole (1.1), preventing that the head of the hexagon-shaped fixing element (7) rotates during the tightening of the nut (8) from the outer part of the housing of the electric machine.

Figure 7:
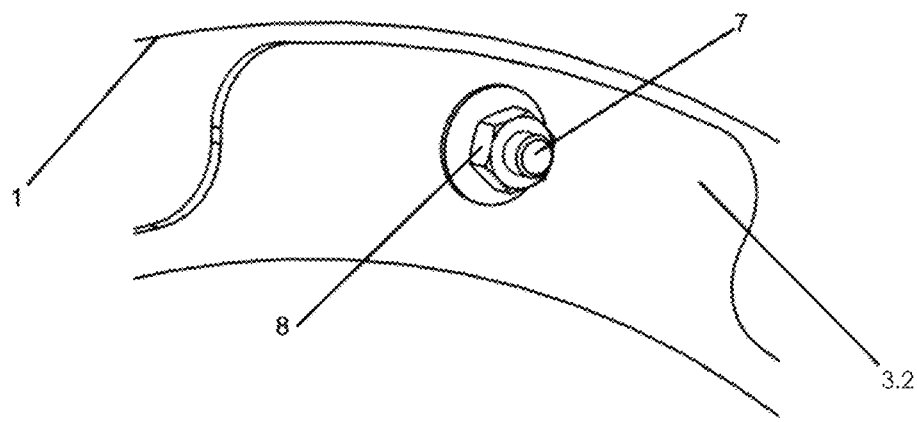

FIG. 7 shows the flap (3.2) of the inner deflector (3) fixed by the hexagonal nut-screw set and on the deflective cover (1), according to FIGS. 5 and 6, seen from the outer part of the motor.

Figure 8:
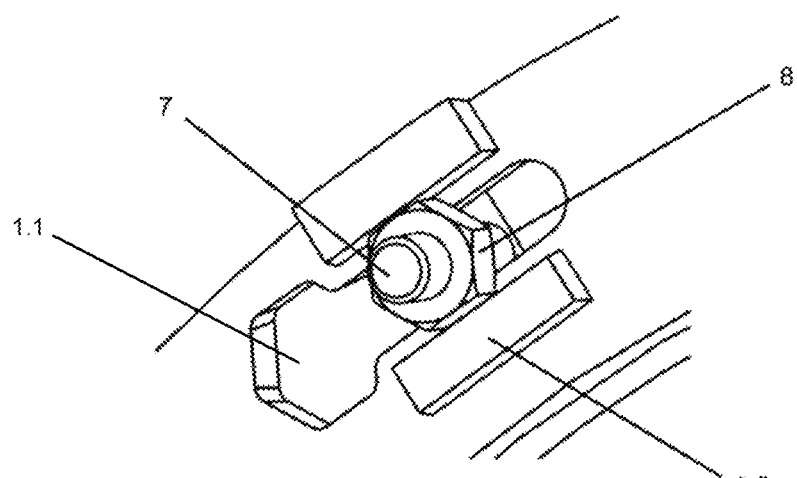
FIGS. 8 and 9 show a second variant of the assembly of the System for fixing the inner deflector on the housing of the electric motor.

FIG. 8 shows a second variant of the assembly of the system for fixing the inner deflector (1) where the hexagon nut (8) is placed in the inner part of the elongated hole (1.1)

of the inner cover and shouldered on the walls (1.2) with the aid of the fixing element (7) inserted from the outer part of the housing of the machine. Thus, the difference between the first and the second assemblies is the position of the fixing element and the nut.

Figure 9:
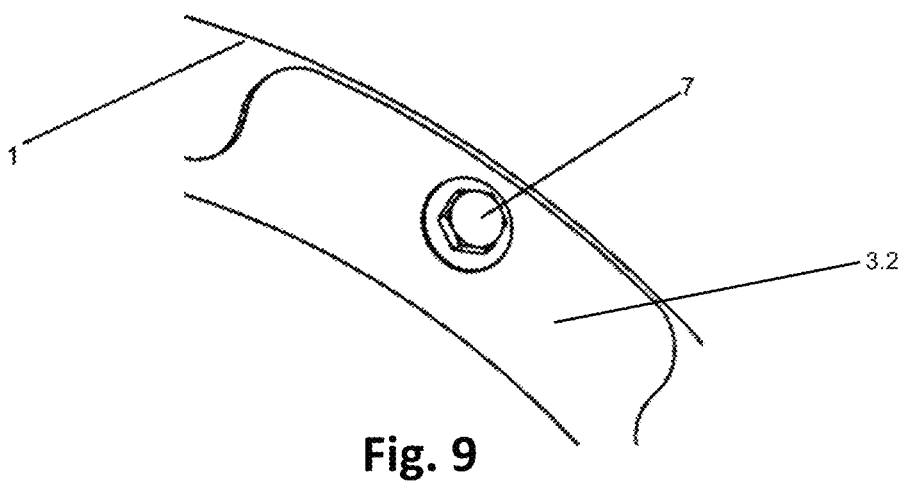

FIG. 9 shows the inner deflector (3) on the deflective cover (1) fixed using the fixing element with hexagonal head (7) and nut (8), according to FIG. 8, seen from the outer part of the machine.

Figure 10:
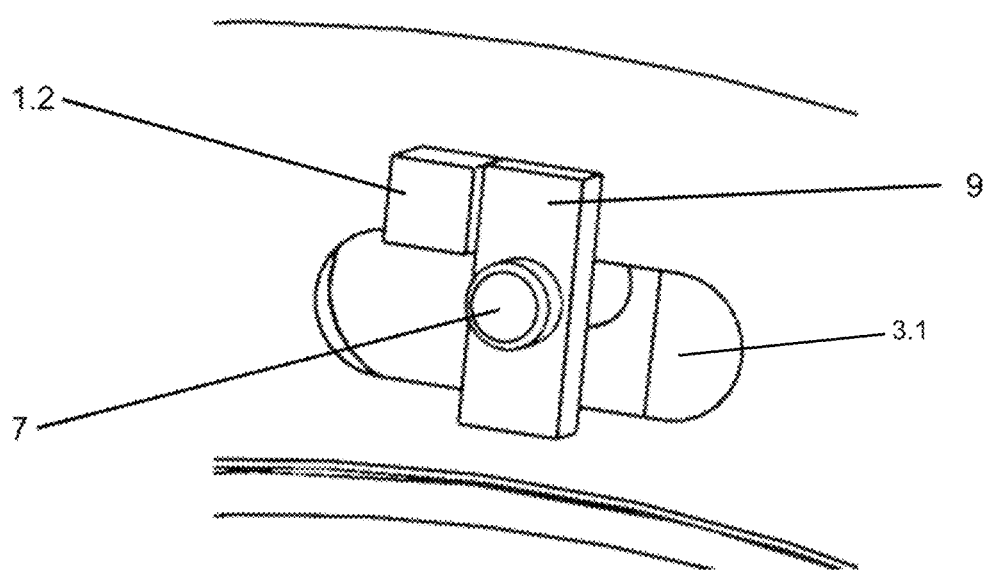
FIG. 10 shows a third variant of the assembly of the System for fixing the inner deflector on the housing of the electric motor.

FIG. 10 shows a second variant of the assembly of the system for fixing where a rectangular nut (9) has dimensions that allow the passage through the elongated holes (3.1) of the inner deflector and through the elongated holes (1.1) of the deflective cover, forming an "X", thus enabling that the rectangular nut (9) is shouldered on the wall (1.2), preventing its rotation during the rotation of the fixing element from the outer part of the electric machine.

Figure 11:
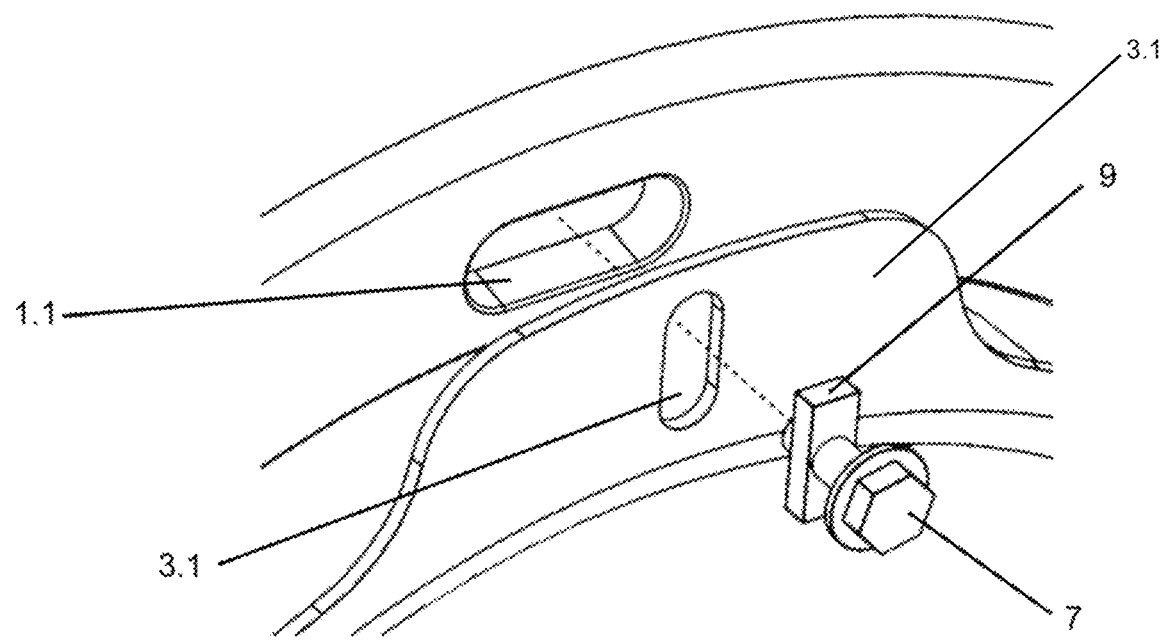
FIG. 11 shows an exploded view of the SYSTEM FOR FIXING detailed in FIG. 10.

FIG. 11 shows the exploded view of the fixing element (7) and rectangular nut (9) set, fitted into the elongated hole (3.1) of the inner deflector (3) and into the elongated hole (1.1) of the deflective cover (1).

The invention claimed is:

1. A system for fixing an inner deflector on a deflective cover of a rotating electrical machine with a fan with fan blades and a housing comprising:
   an inner deflector with an inner part fixed to the deflective cover, wherein the inner deflector has a plurality of flaps, each flap having an inner face facing the housing and an outer face facing outside the housing, wherein fewer than all the flaps having an elongated hole, and wherein the deflective cover and the inner deflector are concentrically positioned; and
   a set of fixing elements, each set configured to fix the alignment of one elongated hole of the inner deflector to one hole of the deflective cover, wherein one fixing element of the set of the fixing elements is prevented from rotating by walls positioned around each elongate hole on the deflective cover, and wherein one fixing element of the set of fixing elements abuts the outer face of the flap;
   wherein a gap size between outer edges of the fan blades and the inner part of the inner deflector is adjustable by adjusting the fixing element of the set of fixing elements that abuts the outer face of the flap.

2. The system according to claim 1, wherein the set of fixing elements comprises a hexagon nut and a screw.

3. The system according to claim 2, wherein the hexagon nut is positioned on an inner part of the housing and the screw is a hexagon screw with a head placed on the outer face of the flap.

4. The system according to claim 2, wherein the hexagon nut is positioned on the outer face of the flap and the screw is a hexagon screw with the head placed on an inner part of the housing.

5. The system according to claim 1, wherein the elongated holes of the inner deflector have a shape selected from the group consisting of a stadium geometry, rectangular with straight corners, beveled and rounded, in tangential direction with one of the edges shaped in a way that enables the passage of at least one of the fixing elements.

6. The system according to claim 1, wherein a fixing element of the set of fixing elements is inserted through at least one of the elongate holes of the deflective cover, the elongate hole having a wall on an inner part that prevents the fixing element of the set of fixing elements from rotating when the set of fixing elements is tightened from an outer side of the housing.

7. The system according to claim 1, wherein at least one of the elongate holes of the deflective cover and at least one of the elongated holes of the inner deflector comprise a stadium geometry formed by rectangle with semicircles at a pair of opposite sides and having a length axis along straight sides and a width axis normal the straight sides, and further comprising at least portion extending in the width axis greater than the radius of the semicircles.

8. The system according to claim 1, wherein at least one of the elongate holes of the deflective cover is in a radial direction and at least one of the elongated holes of the inner deflector is in a tangential direction.

9. The system according to claim 1, wherein at least one of the elongate holes of the deflective cover is in the tangential direction and at least one of the elongated holes of the inner deflector is in the radial direction.

10. The system according to claim 1, wherein the deflector cover has six flaps spaced equidistantly around its perimeter.

11. An adjustment system for adjusting an inner deflector on a deflective cover of a rotating electrical machine having a housing and a fan with fan blades, the adjustment system configured to provide adjustment outside the housing, the adjustment system comprising:
    a deflector cover having a deflector cover aperture, the deflector cover aperture having a fixing wall;
    an inner deflector having an inner part and a flap, the flap having an inner deflector aperture; and
    a fixing element for fixing the inner deflector to the deflector cover concentrically through engagement with the deflector cover aperture and the inner deflector aperture;
    wherein at least a portion of the fixing element is prevented from rotation by the fixing wall;
    wherein when the inner deflector is fixed to the deflector cover, a gap between outer edges of the fan blades and the inner part of the inner deflector is adjustable via activation of at least a portion of the fixing element located outside of the housing.

12. The adjustment system of claim 11, wherein the fixing element comprises two portions, a first portion being a screw and a second portion being a nut threadingly engageable with the screw.

13. The adjustment system of claim 12, wherein activation of at least a portion of the fixing element comprises rotating at least one of the screw and nut.

14. The adjustment system of claim 13, wherein the screw is prevented from rotation by the fixing wall.

15. The adjustment system of claim 13, wherein the nut is prevented from rotation by the fixing wall.

16. The adjustment system of claim 11, wherein the deflector cover comprises a plurality of deflector cover apertures; and
    wherein at least a portion of the deflector cover apertures each have the fixing wall.

17. The adjustment system of claim 11, wherein the inner deflector comprises a plurality of flaps; and
    wherein at least a portion of the flaps each have the inner deflector aperture.

18. The adjustment system of claim 11, wherein the deflector cover aperture comprises a plurality of deflector cover apertures;
    wherein at least a portion of the deflector cover apertures each have the fixing wall;
    wherein the inner deflector comprises a plurality of flaps;
    wherein at least a portion of fewer than all of the flaps each have the inner deflector aperture; and wherein each of the deflector cover apertures and the inner deflector apertures comprise an elongate shape.

19. The adjustment system of claim 18, wherein all the elongate deflector cover apertures extend in one of the tangential and radial direction; and wherein all of the elongate inner deflector apertures extend in the other of the tangential and radial direction.

\* \* \* \* \*